(12) United States Patent
Sortilli

(10) Patent No.: US 6,581,470 B1
(45) Date of Patent: Jun. 24, 2003

(54) INDUCTIVE PRESSURE TRANSDUCER

(75) Inventor: Ugo Sortilli, Genoa (IT)

(73) Assignee: Bitron S.p.A., Nichelino (IT)

( * ) Notice: Subject to any disclaimer, the term of this patent is extended or adjusted under 35 U.S.C. 154(b) by 0 days.

(21) Appl. No.: 09/868,032

(22) PCT Filed: Dec. 13, 1999

(86) PCT No.: PCT/EP99/09862
§ 371 (c)(1),
(2), (4) Date: Oct. 9, 2001

(87) PCT Pub. No.: WO00/36384
PCT Pub. Date: Jun. 22, 2000

(30) Foreign Application Priority Data

Dec. 15, 1998 (IT) .......................... TO98A1048

(51) Int. Cl.⁷ ................................. G01L 9/00
(52) U.S. Cl. ............................. 73/753; 73/730; 73/728
(58) Field of Search ..................... 73/700–756

(56) References Cited

U.S. PATENT DOCUMENTS 4,536,719 A * 8/1985 Baum et al. ................. 73/716
4,665,753 A * 5/1987 Bertrand ..................... 73/706
5,492,017 A * 2/1996 Jennings et al. ............. 73/728

* cited by examiner

Primary Examiner—Max Noori
Assistant Examiner—Andre Allen
(74) Attorney, Agent, or Firm—Sughrue Mion, PLLC

(57) ABSTRACT

The transducer (1) includes a support structure (2, 3) in which a metal body (8) is mounted, having a flat surface (8a) and on the opposite side a cavity (8b) for exposure to a pressure to be transduced. A thin wall (8c), resiliently deformable like a membrane under the effect of the pressure, is defined between the bottom of the cavity (8b) and the flat surface (8a). An inductor (10) a body of ferromagnetic material (11) is securely fixed to the metal body (8) and has a flat surface (11a) facing the flat surface (8a) of the metal body (8) and an annular recess (12) which defines a central core (13) with a winding (16) arranged therein and a surrounding sleeve (14). A spacer wing (9) of paramagnetic or diamagnetic material, and a calibrated thickness, is interposed between the metal body (8) and the ferromagnetic body (11).

12 Claims, 4 Drawing Sheets

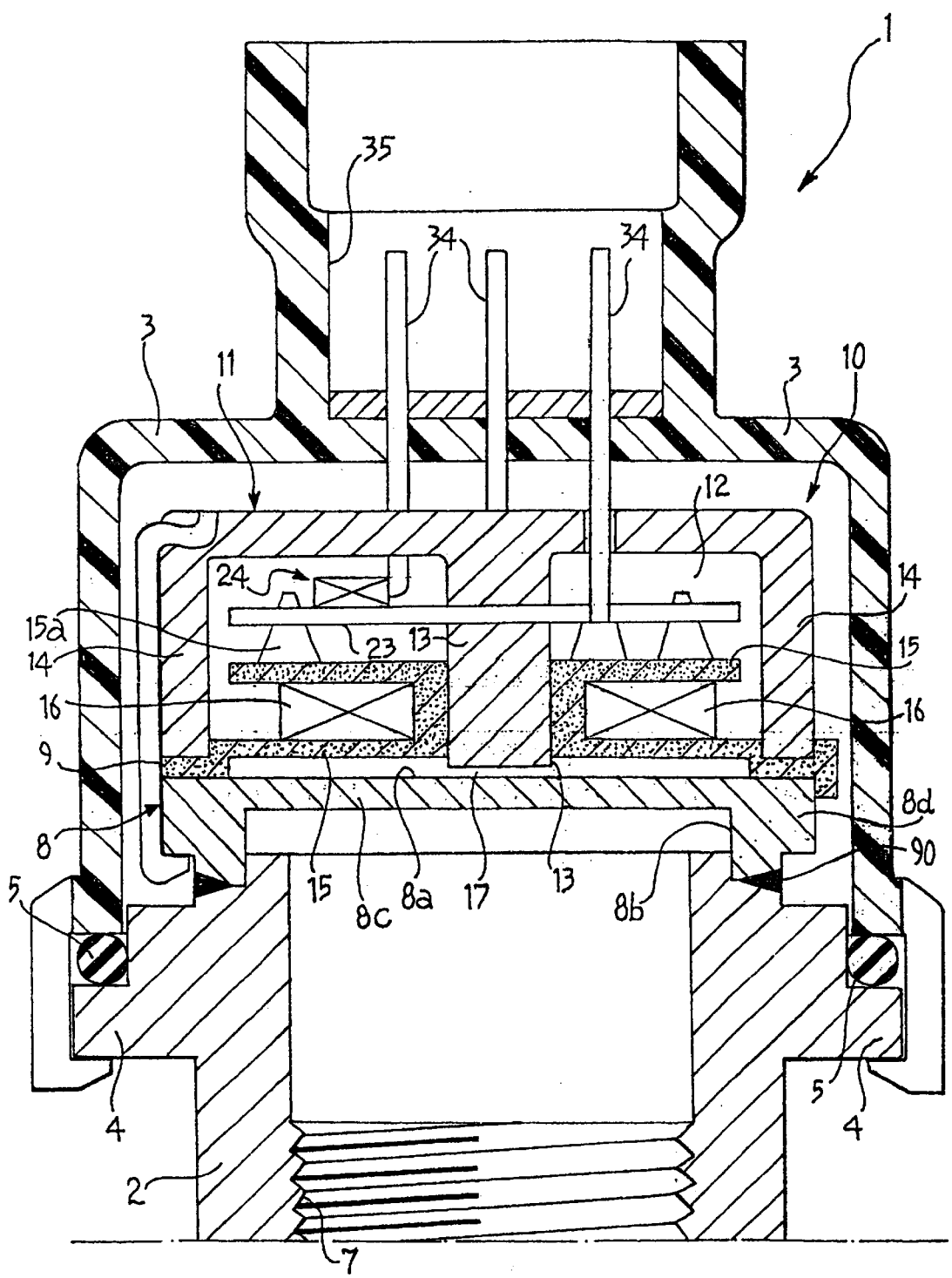

INDUCTIVE PRESSURE TRANSDUCER

BACKGROUND OF THE INVENTION

The present invention relates to an inductive pressure transducer.

More specifically, the invention relates to a pressure transducer which can be used to detect the pressure of a fluid, for example in an air conditioning or climate control system, such as the passenger compartment of a motor vehicle.

SUMMARY OF THE INVENTION

The object of the present invention is to produce a pressure transducer offering a high degree of reliability and accuracy in operation, which is also easy to assemble and calibrate at the production site.

BRIEF DESCRIPTION OF THE DRAWINGS

Further characteristics and advantages of the invention will become clear from the detailed description which follows, provided purely by way of non-limitative example, with reference to the appended drawings, in which:

FIGS. 3 and 4 are axially sectioned views of two different embodiments of the invention.

DETAILED DESCRIPTION OF THE INVENTION

Figure 1:
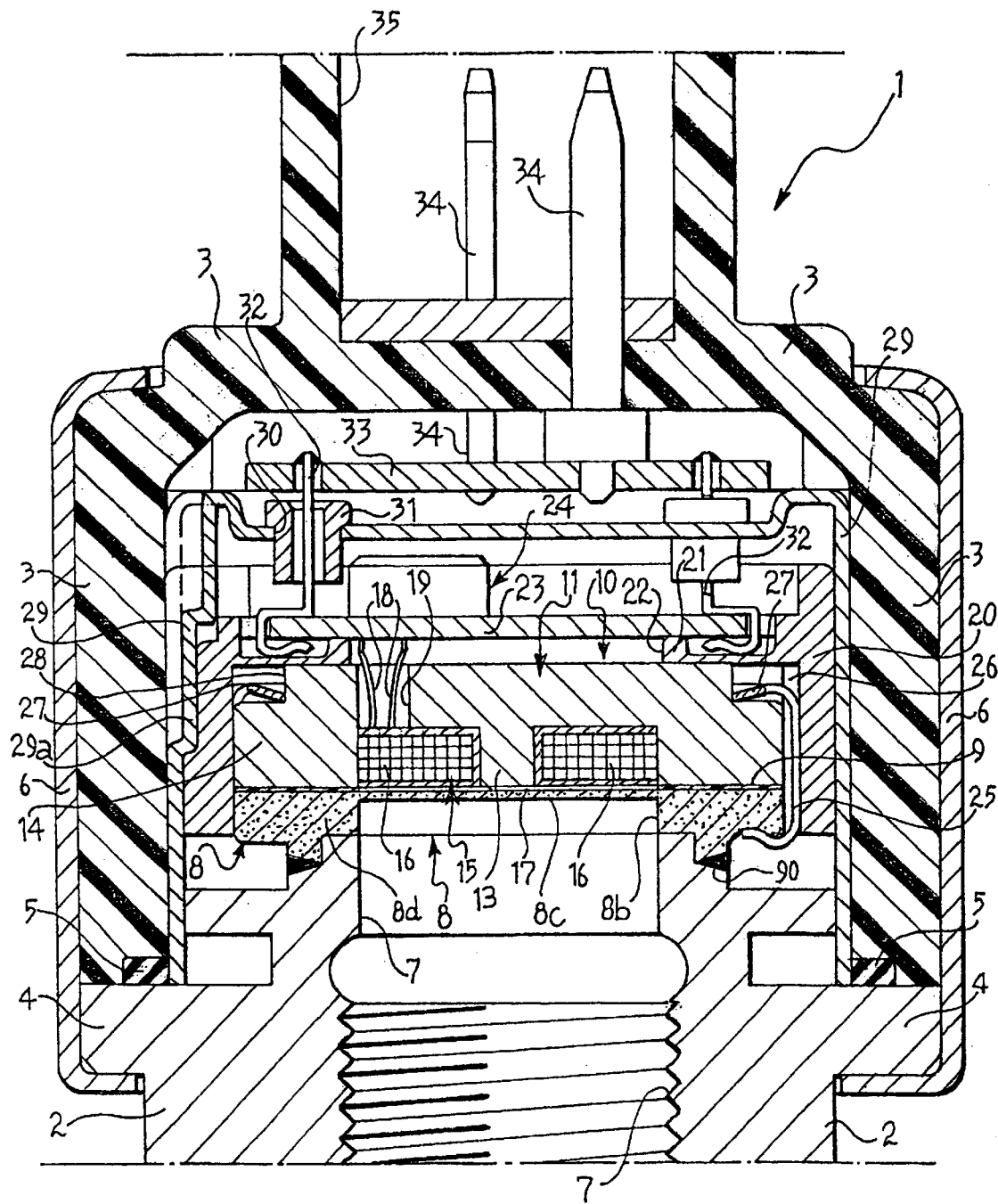
FIG. 1 is an axially sectioned partial view of an inductive pressure transducer according to the invention.

In FIG. 1, an inductive pressure transducer according to the invention is generally indicated 1.

This transducer includes a support structure which, in the embodiment illustrated by way of example, consists of an essentially tubular lower metal body 2 and an essentially bell-shaped upper body 3, made of moulded plastics material, for example. The lower metal body 2 has a radial outer flange 4 on which the lower edge of the bell body 3 rests, with an interposed seal 5. The bodies 2 and 3 are clamped axially against each other by a metal clamping band 6, the edges of which are pressed the one over a shoulder formed in the body 3 and the other beneath the flange 4 of the body 2.

An inlet aperture 7 is formed in the bottom of the lower metal body 2, conveniently threaded to allow coupling with a connector or a pipe for the intake of a fluid the pressure of which is to be measured in the transducer.

The upper end of the metal body 2 extends inside the skirt of the bell-shape body 3. A further metal body, generally indicated 8, is fixed to this end of the body 2. In the embodiment illustrated, the upper end of the body 2 and the lower portion of the body 8 are stepped so as to be complementary. Conveniently, these bodies are fixed to each other by means of a circumferential weld 90, formed by a laser beam or by electron beam welding.

The metal body 8 is made of a martensitic stainless steel, for example, such as an AIAS 630, 17-4 Ph. steel.

At the top, the body 8 has a flat surface 8a. This surface can be ground, for example and possibly finished by lapping.

At the opposite end from the surface 8a, the metal body 8 has a cavity 8b which is essentially cylindrical, and which faces and is coaxial of the passage 7 formed in the lower metal body 2.

This cavity 8b is intended to be exposed to the fluid the pressure of which is to be transduced.

Between the bottom of the cavity 8b and the flat upper surface 8a of the body 8 a thin wall 8c is formed, which is resiliently deformable in the manner of a membrane under the effect of the pressure induced, in operation, through the aperture 7 in the metal body 2.

In any case, the wall 8c is integrally formed with the remaining portion or frame 8d of the body 8, which is welded to the body 2.

Figure 2:
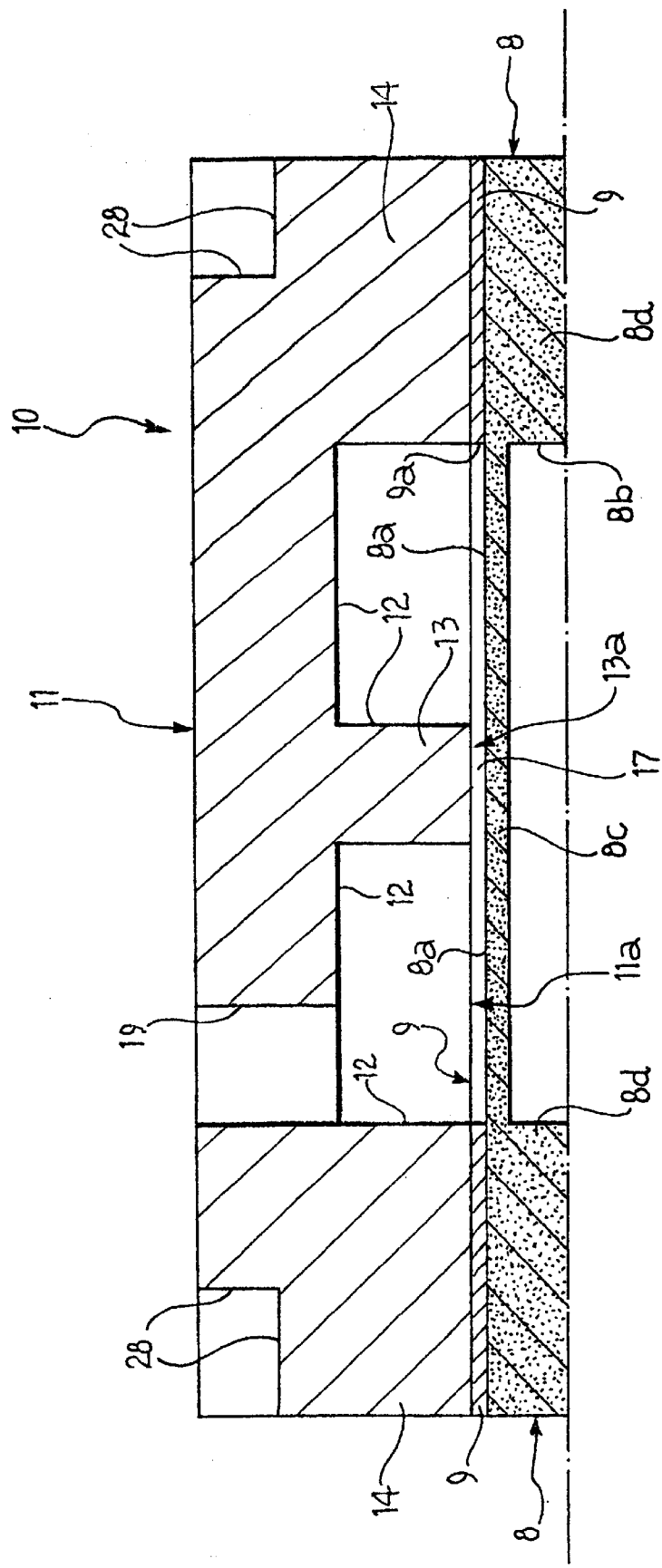
FIG. 2 is an enlarged partial view, in cross section, of some of the components of the transducer of FIG. 1.

A spacer ring 9 (see FIG. 2) is arranged above the flat surface 8a of the metal body 2, made of a material which forms a poor magnetic conductor. The spacer ring 9 can be made, for example, of a paramagnetic or diamagnetic material, such as beryllium copper or a plastics material such as the resins known by the trade names Kapton or Ryton.

The spacer ring 9 has a calibrated uniform thickness and a central hole 9a which leaves the thin wall 8c of the metal body 8 exposed.

An inductor, generally indicated 10, is arranged over the spacer ring 9. This inductor includes a body 11 of ferromagnetic material, preferably a ferrite, having a flat lower surface or face 11a which rests on the spacer ring 9 and in part faces the wall 8c of the body 8, through the hole in the ring 9. An annular recess 12 is formed in the flat face 11a of the ferromagnetic body 11 which defines an essentially cylindrical central core 13 and a surrounding peripheral annular sleeve 14 in the body 11. As seen in FIG. 1, a spool 15 carrying a winding 16 is arranged around the core 13 in the said annular recess. The spool and the winding are not shown in FIG. 2 in order to avoid crowding the drawing.

Thanks to the interposed spacer ring 9, the free end face 13a of the core 13 is separated from the central portion of the upper surface 8a of the wall 8c of the body 8 by an air gap 17 (FIG. 2) the height of which depends on the thickness of the said spacer ring.

The inductance measurable between the ends of the winding 16 depends not only on the characteristics of the winding itself but also on those of the magnetic circuit constituted by the body 8 and the body 11, and on the size of the air gap 17.

With reference to FIG. 1, the ends of the winding 16, indicated 18, extend through a hole 19 in the body 11 of ferromagnetic material. An essentially tubular shaped support body 20 extends above and around the said body 11, forming an internal annular wall 21 around a central aperture 22. The support plate 23 of an electronic circuit 24, to which are connected the ends 18 of the winding 16 of the inductor described above, rests on this wall 21. This circuit is arranged to convert the operating variations in the inductance of the inductor into a signal having a correspondingly variable characteristic, such as its amplitude or frequency.

In the embodiment of FIG. 1, the body 11 of ferromagnetic material and the metal body 8 are axially clamped to each other by a plurality of clamps 25 which lie in longitudinal grooves 26 within the support member 20. The clamps 25 are conveniently constituted by shaped arms extending from the periphery of a ring 27 held in a housing 28 formed in the upper surface of the ferromagnetic body 11.

In FIG. 1, a metal screen, indicated 29 and of essentially inverted cup-shape, is mounted inside the upper body 3, around and above the support element 20. In addition to acting as a barrier to electromagnetic interference, by means of portions of its side wall which are offset inwardly, such as that indicated 29a in FIG. 1, the screen 28 also holds the support element 20 in its axial position.

Openings 30 are formed in the upper portion of the screen 29 with respective annular screening capacitors 31 arranged therein with corresponding connecting conductors 32 passing through them, for connecting the electronic circuit 24 to a connector plate 33 arranged in the upper portion of the support body 3. Terminals 34 are connected to the said plate and extend through an upper transverse wall of the support body 3 to project into a seat 35 formed in the upper portion of the body 3 to act as a connector for external circuits.

In operation, the pressure of the fluid introduced through the aperture 7 in the lower body 2 causes an elastic deformation of the wall 8c of the metal body 8 and a corresponding variation in the air gap 17 between the said wall and the core 13 of the inductor, and thus in the characteristics of the magnetic circuit. There is, therefore, a measurable variation in the inductance across the terminals of the winding 16. The circuit 24 converts the inductance of the inductor into an electric signal a characteristic of which, such as its amplitude or frequency, is indicative of the pressure of the fluid.

In the pressure transducer described above, the magnitude of the air gap 17 at rest (atmospheric pressure at the inlet 7) can be made accurately and repeatably, thanks to the relative ease of forming the facing flat surfaces 8a of the metal body 8 and 11a of the ferromagnetic body 11, as well as the ease with which it is possible to calibrate the thickness of the spacer ring 9. The pressure transducer of the invention can be provided for transducing variable pressure in a wide range of fields, according to the desired application.

It is thus possible to manufacture transducers for detecting pressures varying between 0 and 4.5 bar for use in the boilers of domestic heating systems, or for pressures varying between 0 and around 30 bar for use in industrial-type heating systems, or in climate control systems, in particular for motor vehicles.

The pressure transducer of the invention is also suitable for use at higher pressures, for example for pressures variable between 0 and 120 bar, for use in gasoline direct injection (GDI) systems of internal combustion engines for motor vehicles, or even for pressures variable between 0 and around 2000 bar for direct Diesel injection (DDI) systems.

For the transducing of pressures variable between 0 and 30 bar, for example, the wall 8c of the metal body 8 could have a diameter of between 8 and 15 mm and a thickness between 0.3 and 0.5 mm. The air gap 17 between this wall and the core 13 of the transducer could thus vary between 0.05 and 0.3 mm and the ferrite used for the body 11 of the transducer should be, for convenience, a ferrite having an initial permeability value of $\mu_i \geq 500$, such as ferrites sold by Philips under the code 3C85.

Figure 3:
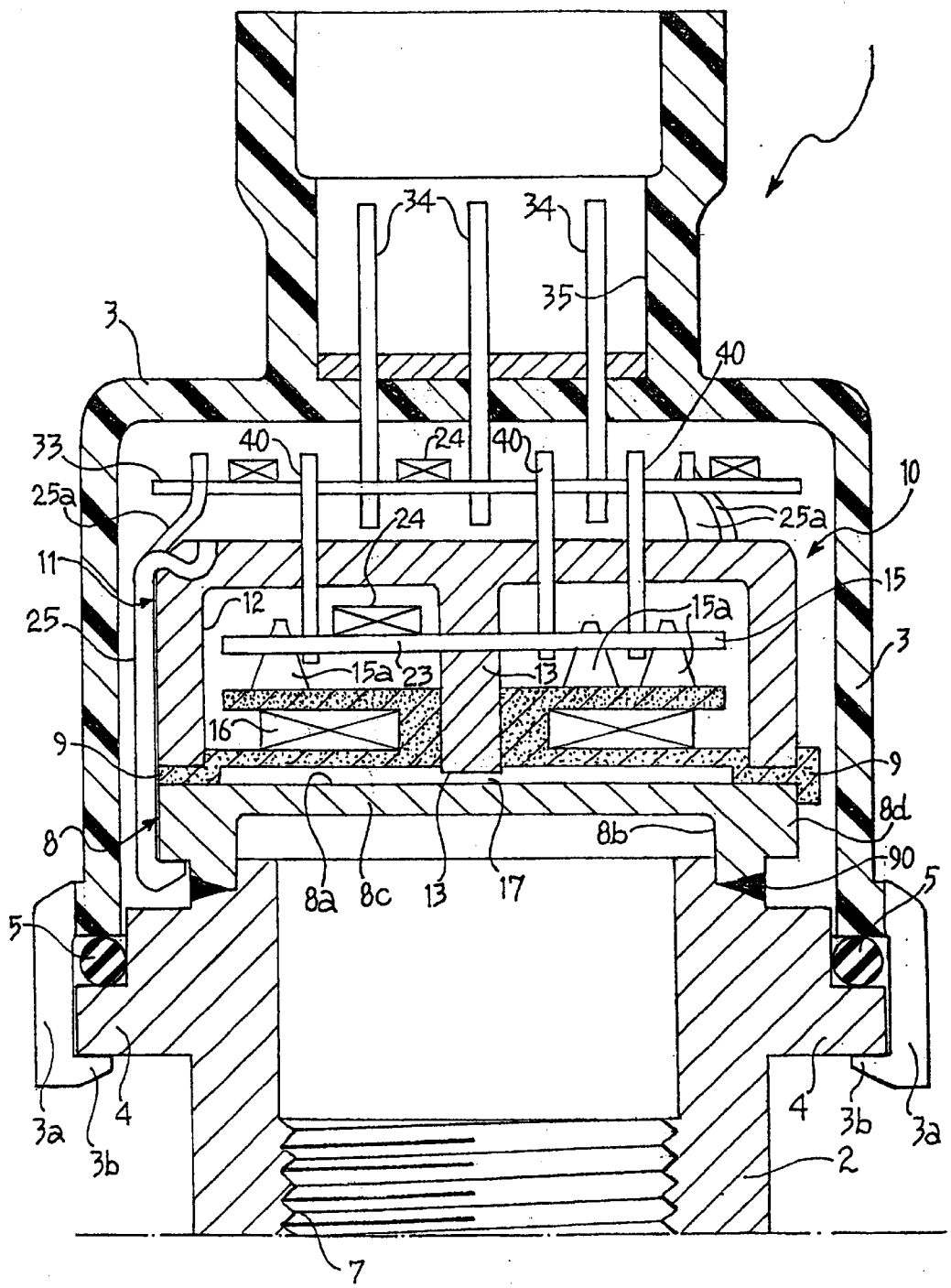

FIG. 3 shows a variant of the pressure transducer of the invention. In this drawing, parts and elements which have already been described are indicated by the same reference numbers.

In the transducer device of FIG. 3, the upper body 3 is directly clamped to the radial flange 4 of the lower metal body 2 by integral extensions 3a having transverse teeth 3b on their lower portion for snap-engagement under the said flange.

In the variant of FIG. 3, the spacer ring 9 is made in one piece with the spool 15 carrying the winding 16 of the inductor. This arrangement could, in fact, also be applied to the device described earlier with reference to FIG. 1.

A further characteristic of the device of FIG. 3 is that the electronic circuit 24, to which the winding 16 is connected, is carried in part by a support plate 23 mounted inside the annular cavity or recess 12 in the ferromagnetic body 11.

The plate 23 is connected to projections 15a of the flange of the spool 15 facing away from the membrane 8c. The portion of circuit carried by the board 23 is connected to the remaining portion of the circuit 24 which is carried by another board 33, arranged above the ferromagnetic element 11. Conductor members 40, extending through the ferromagnetic element 11, interconnect the two portions of the electronic circuit 24.

Conveniently, the clamps 25, which hold the ferromagnetic element 11 and the metal body 8 together axially, have respective support projections 25a fixed to the upper circuit board 33.

FIG. 4 shows a further variant, similar to that described with reference to FIG. 3. Also in FIG. 4, parts and elements already described have been given the same reference numbers.

In the variant of FIG. 4, the entire electronic circuit 24 is carried by a circuit board 23 housed in the annular recess 12 in the ferromagnetic element 11.

In the embodiments of FIGS. 3 and 4, the element 11 of ferromagnetic material acts itself as an effective screen against interference for the circuits housed within it.

In both cases, the output terminals of the circuit 24 are conveniently coupled through corresponding earthed condensers of an SMD type, in order to filter out interference.

Naturally, the principle of the invention remaining unchanged, the embodiments and manufacturing details thereof may vary widely from those described and illustrated here purely by way of non-limitative example, without departing thereby from the scope of the invention, as defined in the appended claims.

What is claimed is:

1. An inductive pressure transducer (1) includes a support structure (2, 3) in which are mounted
   a metal body (8) having a flat surface (8a) at one end and a cavity (8b) at the opposite end which is intended to be exposed to the fluid pressure to be transduced, and in which a thin wall (8c), resiliently deformable in the manner of a membrane under the effect of the pressure, is defined between the bottom of the cavity (8b) and the flat surface (8a);
   an inductor (10) comprising a body of ferromagnetic material (11) securely fixed to the metal body (8) and having a flat surface (11a) facing the said end surface (8a) of the metal body (8), and having an annular recess (12) defining a central core (13) with a winding (16) arranged therein and a surrounding sleeve (14); and
   a spacer ring (9) of paramagnetic or diamagnetic material, of calibrated thickness, interposed between the metal body (8) and the ferromagnetic body (11) in such a way that the distal end (13a) of the core (13) faces the central portion of the deformable wall (8c) of the metal body (8) at a calibrated distance therefrom to define an air gap;
   the arrangement being such that, as the pressure acting on the wall (8c) varies, the wall is deformed resiliently, varying the spacing of the air gap (17) between the wall (8c) and the core (13) and varying, correspondingly, the inductance measurable between the terminals of the inductor (10).

2. A transducer according to claim 1, in which the said metal body (8) is made of stainless steel, preferably of a martensitic type, and the said ferromagnetic body (11) is of ferrite.

3. A transducer according to claim 1, in which the said ferromagnetic body (11) and the said metal body (8) are axially clamped together by a plurality of locking clamps (25).

4. A transducer according to claim 3, in which the said clamps (25) are constituted by shaped longitudinal arms extending from the periphery of a ring (27) arranged in a retaining seat (28) of the ferromagnetic body (11).

5. A transducer according to claim 1, in which the said winding (16) is carried by a spool (15) arranged around the said core (13) and formed integrally with the said spacer ring (9).

6. A transducer according to claim 1, in which the ends (18) of the winding (16) of the inductor (10) extend through at least one aperture (19) in the body of ferromagnetic material (11) and are connected to an electronic treatment circuit (24) mounted within the said support structure (2, 3), between the said body of ferromagnetic material (11) and an essentially cup-shape metal screen (29) which surrounds the inductor (10); the said circuit (24) having terminals (34) which extend through the said screen (29) for connection to external circuits.

7. A transducer according to claim 6, in which the terminals of the said electronic circuit (24) extend through capacitors (31) mounted in corresponding apertures (30) in the said screen (29).

8. A transducer according to claim 1, in which the ends (18) of the winding (16) of the inductor (10) are connected to an electronic treatment circuit (24) housed at least in part in the said annular recess (12) in the ferromagnetic body (11).

9. A transducer according to claim 1, in which the said metal body (8) has an essentially annular frame (Bd) around the said cavity (8b), welded to a tubular support body (2).

10. A transducer according to claim 1, in particular for transducing pressures variable 0 and around 30 bar characterised in that the said wall (8c) has a diameter of between 8 and 15 mm and is between 0.3 and 0.5 mm thick.

11. A transducer according to claim 10, characterised in that the air gap (17) between the distal surface (13a) of the core (13) and the said wall (8c) measures between 0.05 and 0.3 mm.

12. A transducer according to claim 10, characterised in that the said ferromagnetic body is constituted by a ferrite having an initial permeability ($\mu_i$) at least equal to 500.

* * * * *